US012724609B2

(12) United States Patent
Gupta et al.

(10) Patent No.: US 12,724,609 B2
(45) Date of Patent: Sep. 1, 2026

(54) MODULAR APPLICATION SYSTEM DECOMPOSED INTO SEPARATE MICRO FRONTENDS TO SUPPORT PERSONALIZED APPLICATION FLOWS

(71) Applicant: Capital One Services, LLC, McLean, VA (US)

(72) Inventors: Mayur Gupta, Frisco, TX (US); Indu Jain, Frisco, TX (US); Preethi Maheshwaram, Plano, TX (US); Sahul Peer Mohammed, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 205 days.

(21) Appl. No.: 18/456,789

(22) Filed: Aug. 28, 2023

(65) Prior Publication Data

US 2025/0077229 A1 Mar. 6, 2025

(51) Int. Cl.
*G06F 9/30* (2018.01)
*G06F 9/54* (2006.01)

(52) U.S. Cl.
CPC ............ *G06F 9/3005* (2013.01); *G06F 9/541* (2013.01)

(58) Field of Classification Search
CPC ............................... G06F 9/3005; G06F 9/541
See application file for complete search history.

(56) References Cited

U.S. PATENT DOCUMENTS 10,769,677 B1 * 9/2020 Agrawal ............ G06Q 30/0275
10,778,705 B1 * 9/2020 Park ......................... G06N 3/09
11,093,991 B2 * 8/2021 Singh ................. G06Q 30/0623
11,216,602 B2 * 1/2022 Bourhani .............. G06F 3/0482
11,314,416 B1 * 4/2022 Shveidel ................. G06F 3/064
11,693,914 B2 * 7/2023 Chugh ...................... G06F 8/38 715/234
11,966,719 B2 * 4/2024 Pfeifer .................... G06F 9/542
2010/0235885 A1 * 9/2010 Persson ................... H04L 67/02 726/4
2015/0081617 A1 * 3/2015 Shaik ................ G06Q 30/0241 707/602
2020/0257748 A1 * 8/2020 Bellare .................. G06F 40/30
(Continued)

FOREIGN PATENT DOCUMENTS

CN 120872507 A * 10/2025 ......... G06F 12/1036
WO WO-2021101510 A1 * 5/2021 ......... G06F 21/6254
WO WO-2023101662 A1 * 6/2023 ............... G06F 9/38

*Primary Examiner* — Daniel S Felten
(74) *Attorney, Agent, or Firm* — Harrity & Harrity, LLP

(57) ABSTRACT

In some implementations, a system may host an application that includes a host container and multiple micro frontend (MFE) components that each include an interface associated with the application. The system may receive, at the host container and from a client device, a request to initiate the application. The system may identify a set of attributes associated with a user that provided the request to initiate the application. The system may determine a flow associated with the application based on the set of attributes associated with a user that provided the request to initiate the application, wherein the flow associated with the application includes a sequence in which a subset of the multiple MFE components is presented to the user. The system may present, to the client device, the subset of the multiple MFE components in accordance with the flow based on the set of attributes associated with the user.

20 Claims, 7 Drawing Sheets

100

105
Perform linear application process

110
Prequalification flow

115
Apply flow

(56) References Cited

U.S. PATENT DOCUMENTS

| | | | | |
|---|---|---|---|---|
| 2022/0027417 | A1* | 1/2022 | Katz | G06F 16/90335 |
| 2022/0078288 | A1* | 3/2022 | Iorg | G06F 16/972 |
| 2022/0197563 | A1* | 6/2022 | Lam | G06F 3/0659 |
| 2022/0366408 | A1* | 11/2022 | Vimberg | G06Q 20/127 |
| 2024/0248766 | A1* | 7/2024 | Li | G06F 9/5044 |
| 2025/0077229 | A1* | 3/2025 | Gupta | G06F 9/3005 |
| 2025/0077315 | A1* | 3/2025 | Gupta | G06Q 40/03 |
| 2025/0335336 | A1* | 10/2025 | Pham | G06F 11/368 |

* cited by examiner

| | UT-1 | UT-2 | UT-3 | UT-4 |
|---|---|---|---|---|
| Web | Path A | Path C | Path H | N/A |
| Direct Mail | Path F | Path G | Path B | Path I |
| Email | Path D | Path B | Path Q | N/A |
| Credit Monitor | Path N | Path M | Path O | Path P |

| | | | |
|---|---|---|---|
| Single Applicant | eTitle | Non-Stips | Path A1 |
| | | Stips | Path A2 |
| Single Applicant | Non-eTitle | Non-Stips | Path A3 |
| | | Stips | Path A4 |

300

MODULAR APPLICATION SYSTEM DECOMPOSED INTO SEPARATE MICRO FRONTENDS TO SUPPORT PERSONALIZED APPLICATION FLOWS

BACKGROUND

In a micro frontend (MFE) architecture, a web application may be designed and developed in a manner that aims to address challenges posed by monolithic frontend systems. For example, in an MFE architecture, a complex web application is typically decomposed into several smaller, self-contained, and loosely coupled frontend modules, with each module responsible for a specific feature or specific functionality. The modules, often referred to as "micro frontends," are generally developed, tested, and deployed independently, which allows different teams to work on separate parts of the application concurrently. The modularized MFE architecture also fosters better code organization, reusability, and maintainability, and enables efficient scaling and reducing the impact of changes or updates to a specific MFE.

SUMMARY

Some implementations described herein relate to a system for personalizing an application flow. The system may include one or more memories and one or more processors communicatively coupled to the one or more memories. The one or more processors may be configured to host an application that includes a host container and a plurality of micro frontend (MFE) components that each include an interface associated with the application, wherein the host container provides an entry point to the application, and wherein each interface included in a respective MFE component of the plurality of MFE components includes one or more interactive elements. The one or more processors may be configured to receive, from a client device, a request to initiate the application, wherein the request is received at the host container that provides the entry point to the application. The one or more processors may be configured to determine a flow associated with the application based on a set of attributes associated with a user that provided the request to initiate the application, wherein the flow associated with the application includes a sequence in which a subset of the plurality of MFE components is presented to the user. The one or more processors may be configured to present, to the client device, the subset of the plurality of MFE components in accordance with the flow that is based on the set of attributes associated with the user.

Some implementations described herein relate to a method for personalizing an application flow. The method may include hosting, by a system, an application that includes a host container and a plurality of MFE components that each include an interface associated with the application. The method may include receiving, by the system and from a client device, a request to initiate the application, wherein the request is received at the host container. The method may include identifying, by the system, a set of attributes associated with a user that provided the request to initiate the application. The method may include determining, by the system, a flow associated with the application based on the set of attributes associated with a user that provided the request to initiate the application, wherein the flow associated with the application includes a sequence in which a subset of the plurality of MFE components is presented to the user. The method may include presenting, by the system and to the client device, the subset of the plurality of MFE components in accordance with the flow based on the set of attributes associated with the user.

Some implementations described herein relate to a non-transitory computer-readable medium that stores a set of instructions. The set of instructions, when executed by one or more processors of a system, may cause the system to host an application that includes a host container and a plurality of MFE components that each include an interface associated with the application. The set of instructions, when executed by one or more processors of the system, may cause the system to receive, from a client device, a request to initiate the application, wherein the request is received at the host container. The set of instructions, when executed by one or more processors of the system, may cause the system to determine a flow associated with the application based on a set of attributes associated with a user that provided the request to initiate the application, wherein the flow associated with the application includes a sequence in which a subset of the plurality of MFE components is presented to the user. The set of instructions, when executed by one or more processors of the system, may cause the system to present, to the client device, the subset of the plurality of MFE components in accordance with the flow that is based on the set of attributes associated with the user.

DETAILED DESCRIPTION

The following detailed description of example implementations refers to the accompanying drawings. The same reference numbers in different drawings may identify the same or similar elements.

Figure 1:
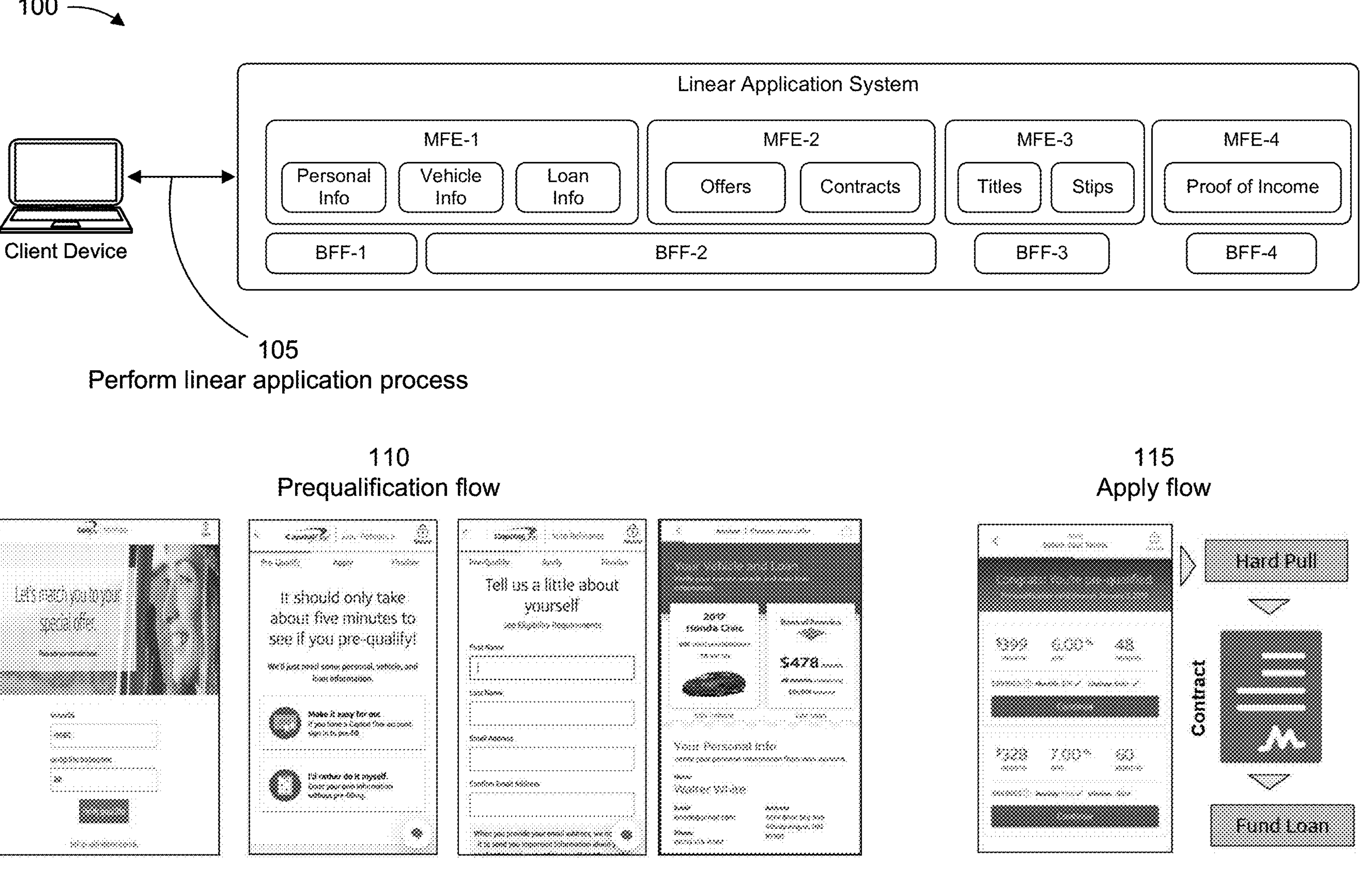
FIG. 1 is a diagram of an example of a linear application system that provides a static and linear application flow, in accordance with some embodiments of the present disclosure.

FIG. 1 is a diagram of an example 100 of a linear application system that provides a static and linear application flow. As shown in FIG. 1, and by reference number 105, example 100 includes a client device that may interact with the linear application system to perform a linear application process. As shown in FIG. 1, the linear application hosts a web application associated with a linear micro frontend (MFE) architecture that provides a static and linear application flow regardless of a type of a user associated with the client device, a device type associated with the client device, and/or any other attributes that may be specific to the client device or the user associated with the client device. For example, in FIG. 1, the linear application system provides a web application that includes various MFEs associated with a vehicle loan application, where the MFEs include a first MFE (shown as MFE-1) that includes one or more interfaces to obtain personal information associated with the user, one or more interfaces to obtain information associated with a vehicle that the user is interested in purchasing, and one or more interfaces to obtain information associated with one or more loan terms for the vehicle loan (e.g., to facilitate obtaining prequalification for a vehicle loan). Furthermore, the MFEs associated with the vehicle loan application include a second MFE (shown as MFE-2) that includes one or more interfaces to present loan offers to the user and to define contract terms for the loan offers, a third MFE (shown as MFE-3) that includes one or more interfaces to resolve vehicle title issues and stipulations associated with a loan contract that has been approved for the user, and a fourth MFE (shown as MFE-4) that includes one or more interfaces to obtain proof of the user's income.

In addition, as further shown in FIG. 1, the linear application system includes various backend for frontends (BFFs), which are services that enable interaction between the MFEs and one or more backend services associated with the vehicle loan application. As shown in FIG. 1, the BFFs are not associated with a one-to-one mapping in the linear application system, as some MFEs are associated with more than one BFF and some BFFs are associated with more than one MFE. For example, the first MFE is associated with a first BFF (shown as BFF-1) that is used for interacting with the backend services when a user progresses through a series of interfaces associated with a prequalification process, and a second BFF (shown as BFF-2) that is also used for interacting with the backend services when the user progresses through certain interfaces associated with the prequalification process. Furthermore, the second BFF is also associated with the second MFE to interact with the backend services when the user progresses through interfaces associated with the loan application process. In some cases, the relationship between the MFEs and the BFFs and the overall design of the linear application system results in a static flow between the interfaces associated with the application, where every user that submits a request to initiate the vehicle loan application is presented with the same sequence of MFEs. However, in some cases, the need to present interfaces associated with certain MFEs may vary for different users, client device types, or the like (e.g., depending on whether the user is an existing customer of a lender or financial services provider associated with the linear application system, which may impact whether and/or the extent to which certain attributes associated with the user are available to the linear application system). In a similar respect, the order or sequence in which the interfaces are presented to the user may vary among different users and/or device types.

For example, in FIG. 1, reference number 110 depicts a prequalification flow that includes one or more interfaces associated with the first MFE, which may be presented to the user to obtain prequalification for a vehicle loan using a soft credit pull that does not impact the user's credit score. For example, in the prequalification flow shown in FIG. 1, the user may be presented with a first interface to match the user to one or more prequalification offers, which is followed by a second interface that provides the user with different options to initiate the prequalification process, which is followed by a third interface to obtain personal information about the user, which is then followed by a fourth interface in which the user provides information related to a vehicle that the user is seeking to finance. In this example, the first interface of the prequalification flow includes fields for a user to enter an access code that was given to the user and information to enable a soft credit pull. However, in cases where the user is an existing customer of the financial institution, the linear application system may already have access to a credit score associated with the user, rendering at least part of the first interface unnecessary. Similarly, the second interface provides options to pre-fill the personal information, vehicle information, and loan information for existing customers or users, which may be an unnecessary option for users that have no existing records accessible to the linear application system. In addition, the vehicle information interface is presented last, but in some cases a user may wish to initiate the vehicle loan application from an interface related to the vehicle, rather than having to progress through several earlier interfaces and then enter the information associated with the relevant vehicle. In another example, reference number 115 depicts a loan application flow, where a user that has prequalified for a given set of loan terms (e.g., a term of months or years, a monthly payment, and an interest rate) may then apply for the loan, which may be followed by one or more interfaces to perform a hard credit pull, one or more interfaces to present and sign a contract, and one or more interfaces to complete funding of the loan.

However, the linear framework shown in FIG. 1 lacks flexibility to present different users with different experiences of the application hosted by the linear application system. For example, in the context of a vehicle loan application, a logical progression through the vehicle loan application may be to present the MFE(s) related to contract and terms toward the end of the flow associated with the vehicle loan application, and for other users logical progression through the vehicle loan application may be to present the MFE(s) related to contract and terms toward the beginning of the flow associated with the vehicle loan application. Furthermore, although the drawbacks of the linear application system are described herein with respect to a vehicle loan application, the vehicle loan application is described for illustrative purposes only and the same or similar drawbacks may occur for any suitable application in which each user is presented with the same sequence of MFEs regardless of any specific attributes associated with the user, the client device, or the like.

Accordingly, in some implementations, a modular application system may provide a modular MFE architecture in which a web application is decomposed into separate MFEs to support a personalized application flow based on one or more attributes that are specific to a user context, such as a marketing channel, a user type, and/or a device type, among other examples. For example, in some implementations, the modular application system may improve upon linear and static application flows that have little or no customization for a specific user context. On the other hand, the modular application system described herein may enable a plug-and-play approach, where various pages or interfaces associated with a web application are each associated with a separate MFE and corresponding BFF. For example, in some implementations, the modular application system may include a host container that provides an entry point to the hosted application, which may be associated with a user segmentation service that defines various paths through the hosted application. Accordingly, when the host container receives a request to initiate the application, the host container orchestrates the MFEs that are needed for a specific user context (e.g., determines the flow of the application), which allows a more personalized experience based on the attributes of each particular user, client device, or the like. Furthermore, as the user starts to interact with the application, the modular application system may capture the actions that are performed by the user, which may be passed back to the segmentation service as additional parameters (e.g., in addition to user and/or device attributes). The whole set of parameters that define the current user context may then be used to run a machine learning model to determine the next MFE to be presented to the user, which may include targeted messages to the user based on the actions that the user has already performed, the profile of the user, the application type, and/or other suitable attributes. In this way, the modular application system may dynamically determine and refine the flow of the application as the user continues to perform actions or interactions and/or provide inputs to the application, which may result in ongoing, dynamic personalization of the application for the current context.

As indicated above, FIG. 1 is provided as an example. Other examples may differ from what is described with regard to FIG. 1.

Figure 2A:
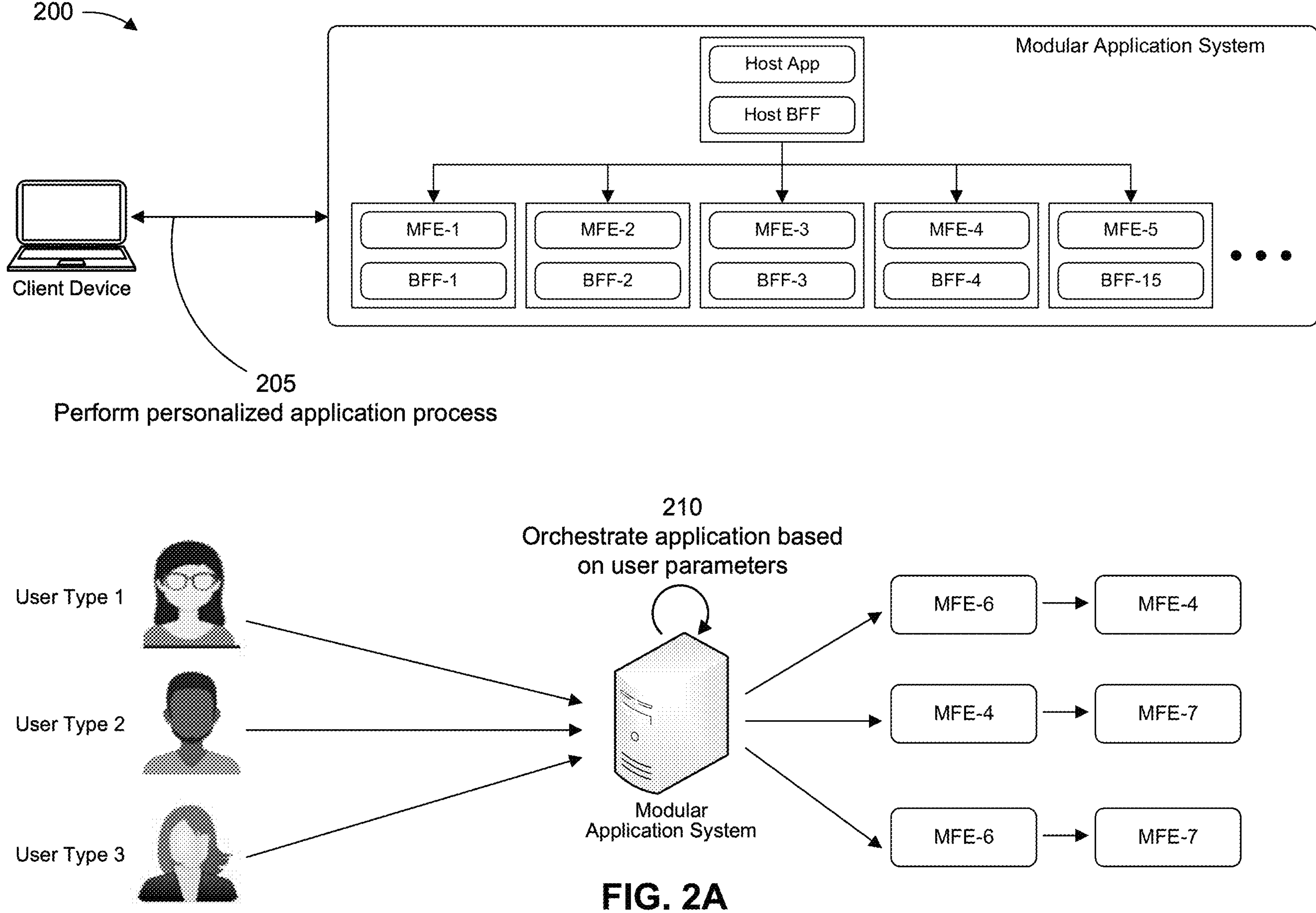
FIGS. 2A-2C are diagrams of an example implementation associated with a modular application system decomposed into separate micro frontends (MFEs) to support personalized application flows, in accordance with some embodiments of the present disclosure.
Figure 2B:
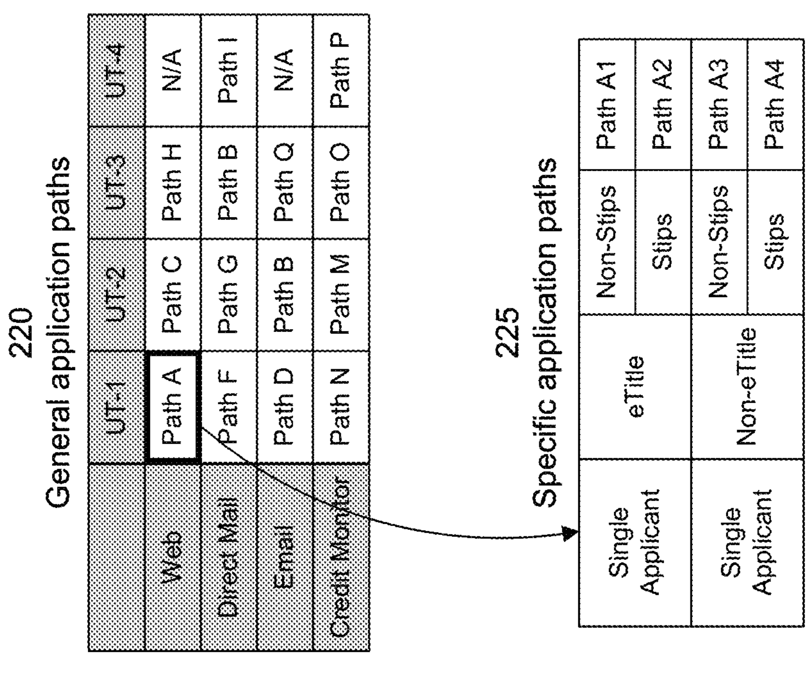
Figure 2B:
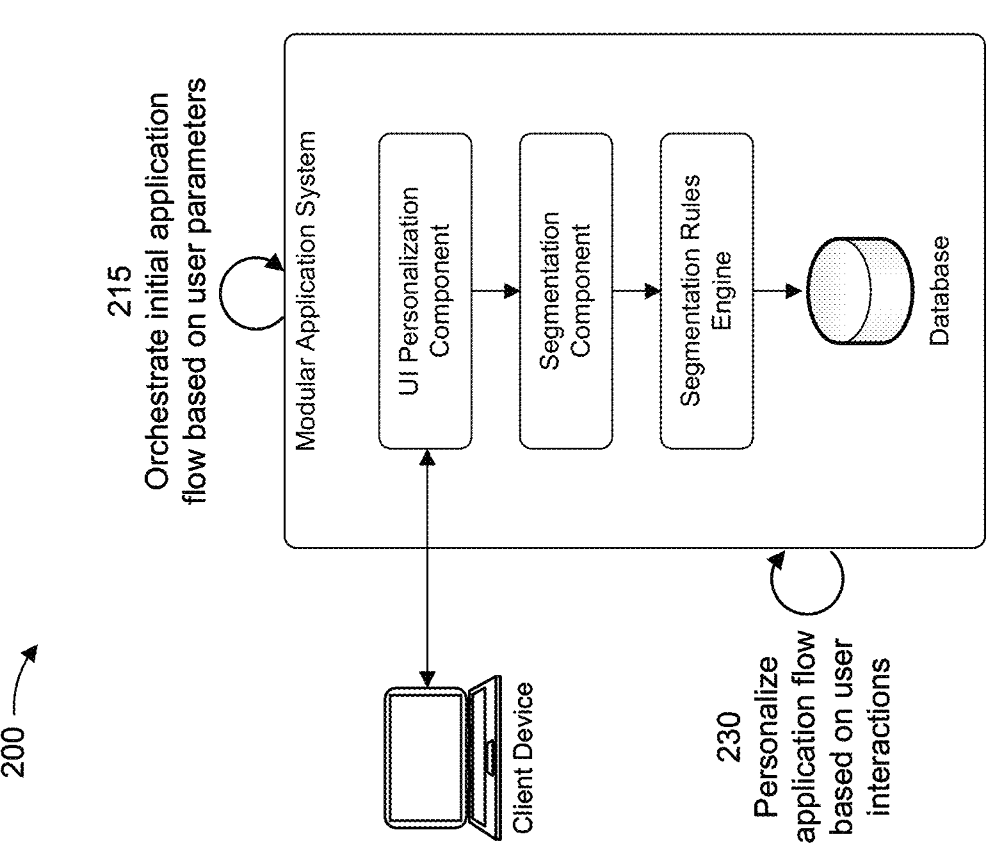
Figure 2C:
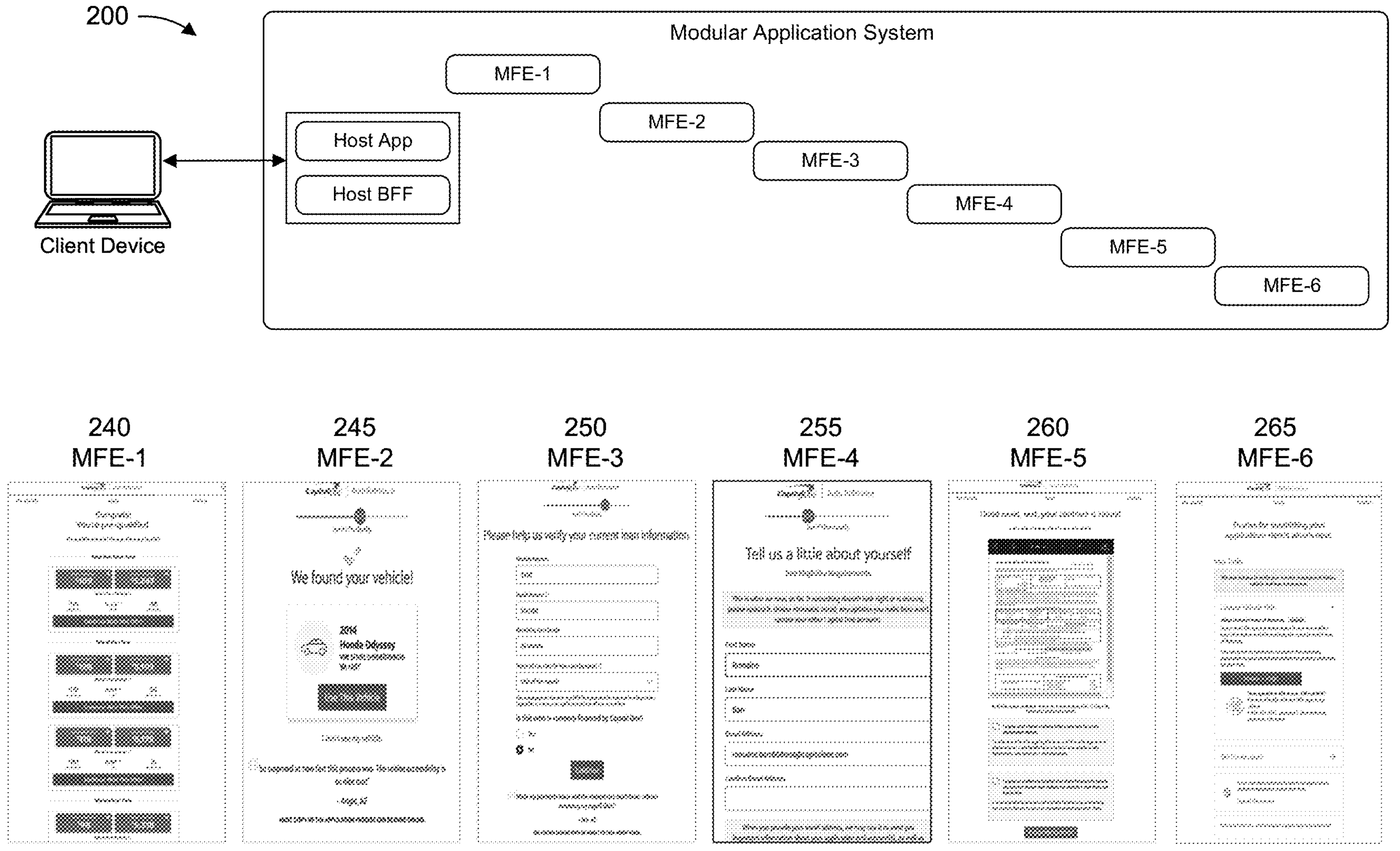

FIGS. 2A-2C are diagrams of an example 200 associated with a modular application system decomposed into separate MFEs to support personalized application flows. As shown in FIGS. 2A-2C, example 200 includes a client device and a modular application system. The client device and modular application system are described in more detail in connection with FIGS. 3-4.

As shown in FIG. 2A, the modular application system may host an application that includes a host container and various MFE components that each include an interface associated with the application. For example, as described herein, the modular application system may generally host an application that is decomposed into various MFE components, each of which is a smallest application (e.g., a "just enough" application) to implement a given set of interfaces or functionality associated with the application, which may be presented to a user of the client device in any suitable order or sequence depending on attributes of a current user context (e.g., attributes of the user, the client device, ongoing interactions or behaviors, or the like). Accordingly, the host container may provide an entry point to the application, and each interface associated with a respective MFE component may include one or more interactive elements that are used to obtain and/or provide information related to a particular phase or segment associated with the application. Furthermore, as shown in FIG. 2A, the host container and each MFE component is associated with a respective (e.g., dedicated) BFF to enable communication with one or more backend microservices. In this way, each MFE has a one-to-one mapping with an associated BFF, which enables a uniform approach to communicate with the backend microservices such that the flow of the application can be dynamically customized or personalized for the user of the client device in an ongoing manner.

For example, in example 200, the modular application system hosts an application that includes various MFE components related to a vehicle loan application, although the modular architecture shown in FIGS. 2A-2C may be applied to any suitable application. For example, in some implementations, the vehicle loan application may include separate MFEs, each of which includes separate interfaces and interactive elements for a given set of functionalities and a separate BFF for communicating with the backend microservices to support the functionality associated with the corresponding MFE. For example, in the context of the vehicle loan application shown in FIGS. 2A-2C, the MFEs may include a first MFE component (shown as MFE-1) (e.g., for obtaining personal information), a second MFE component (shown as MFE-2) (e.g., for obtaining vehicle information), a third MFE component (shown as MFE-3) (e.g., for obtaining vehicle loan information), a fourth MFE component (shown as MFE-4) (e.g., for presenting vehicle loan offers), a fifth MFE component (shown as MFE-5) (e.g., for defining and agreeing on contract terms for a vehicle loan), and/or other suitable MFE components (e.g., for vehicle titles, stipulations, and/or loan funding, among other examples). Accordingly, the modular application system may decompose a web application or other suitable application into multiple smaller MFE components based on the capabilities or needs of the application (e.g., prequalification, offer selection, vehicle information, hard credit pull, or the like, for a vehicle loan application), and the host container providing the entry point to the application may communicate with a user segmentation service or other suitable backend microservice to determine the flow of the application to orchestrate a sequence of MFE components (or associated interfaces) to present to the user based on a set of attributes that relate to a current user context (e.g., which may dynamically change over the course of interactions between the user and the application).

For example, as shown by reference number 205 in FIG. 2A, the modular application system may receive, from a client device, a request to initiate the application at the host container that provides the entry point to the application, which may result in the client device and the modular application system interacting with one another to perform a personalized application process. For example, when the request to initiate the application is received at the host container, the host container may then invoke a user or customer segmentation service to determine one or more attributes that relate to an initial context associated with the user that submitted the request and configure an initial flow for the application (e.g., a sequence of MFE components and/or a sequence of interfaces or pages associated with the MFE components) based on the one or more attributes that relate to the initial context associated with the user that submitted the request. Additionally, or alternatively, the host application included in the host container may invoke a machine learning model to select an initial flow of the application (e.g., alone or in combination with information provided by the segmentation service), and the host application may capture subsequent actions performed by the user to refine the initial flow of the application (if appropriate) based on the initial attributes related to the user context and the information related to the subsequent actions performed by the user.

For example, as shown by reference number 210, the modular application system may orchestrate the application, by selecting a subset of the MFE components to be presented to the user and the sequence in which the selected subset of the MFE components is to be presented to the user, based on the attributes that relate to the current context of the user. For example, in the context of the vehicle loan application shown in FIGS. 2A-2C, potential users that may interact with the vehicle loan application may include one or more users associated with a first user type (e.g., users that have prequalified or been preapproved for a given set of vehicle loan terms), one or more users associated with a second user type (e.g., users that have received an offer guaranteeing a specific loan rate and/or guaranteeing that the loan rate will not exceed a given maximum), and/or one or more users associated with a third user type (e.g., users for which there is no prior or existing data available such that the users of the third type cannot be preapproved or prequalified for a loan offer or guaranteed any specific rate terms). In the example illustrated by reference number 210, different users may be presented with different subsets of the MFE components, and/or different sequences of the MFE components, depending on whether the user is associated with the first user type, the second user type, the third user type, or another user type. For example, as shown in FIG. 2A, a user associated with the first user type may be presented with a first sequence of MFE components that includes an MFE component related to stipulations followed by an MFE component related to offers, a user associated with the second user type may be presented with a second sequence of MFE components that includes the MFE component related to offers followed by an MFE component related to income verification, and a user associated with the third user type may be presented with a third sequence of MFE components that includes the MFE component related to stipulations followed by the MFE component related to income verification. However, the specific subset of MFE components that are selected and/or the sequence in which the selected subset of MFE components are presented may be different from that shown in FIG. 2A and/or may be based on additional and/or different attributes than the user type. For example, in some implementations, the attributes that make up the current user context may include a device type (e.g., whether the user of the client device is accessing the modular application system from a mobile device, a web browser, a desktop device, a laptop device, or the like) and/or a marketing channel associated with the user (e.g., whether the user is accessing the modular application system from a portal associated with a financial services provider, a credit monitoring service, an Internet search, or a website of the financial services provider associated with the modular application system).

In some implementations, as shown in FIG. 2B, and by reference number 215, the modular application system may orchestrate the initial flow of the application based on various parameters or attributes that relate to the initial context of the user submitting the request to initiate the application. For example, FIG. 2B illustrates an exemplary segmentation component associated with the modular application system, where the client device interacts with a user interface personalization component that communicates with the segmentation component to determine the subset of MFE components to present to the client device and the sequence in which to present the selected subset of MFE components. For example, as shown, the segmentation component may be coupled to a segmentation rules engine that divides a potential user population into various segments, which may be based on attributes such as a user type, a device type (e.g., mobile, web, desktop, or laptop), and/or channel (e.g., client portal, credit monitoring, Internet search, direct mail, or website), and a database that includes information accessible to the segmentation rules engine (e.g., related to existing users and/or defining the parameters for organizing the user population into different segments). Additionally, or alternatively, a machine learning model may be implemented by one or more components of the segmentation service to select the subset of MFE components to present to the client device and/or the sequence in which to present the selected subset of MFE components. For example, as described herein, the machine learning model may be configured to determine an initial application flow that includes a subset of the MFE components associated with the application hosted by the modular application system and a sequence in which to present the subset of the MFE components to the client device based on a category associated with the user (e.g., whether the user is associated with a user type including users that are prequalified or preapproved for a vehicle loan, users who are guaranteed a given rate for a vehicle loan, or users for which there is little or no available information), a channel associated with the user (e.g., whether the user initiated the request from a web application, in response to a direct mail offer, in response to an email offer, or through a credit monitoring service), and/or a device type associated with the client device (e.g., mobile, desktop, laptop, or the like).

For example, as shown by reference number 220 in FIG. 2B, the modular application system may define multiple paths associated with the application, where the multiple paths each correspond to a subset of the MFE components and a sequence in which to present the corresponding subset of the MFE components for a combination of attributes that relate to the current context associated with the user. In some implementations, the multiple paths may include a set of general application paths, each of which may be mapped to a combination of attributes (e.g., a user or customer segment), and the general application paths may be refined according to a set of specific application sub-paths that define the specific MFE components and/or interfaces to be presented to users that are associated with a context that maps to a specific user or customer segment. For example, as shown in FIG. 2B, the general application paths may include a first path ("Path A") for users associated with a first user type (shown as UT-1) that accessed the modular application system from a web interface or web portal associated with a financial services provider, a second path ("Path C") for users associated with a second user type (shown as UT-2) that accessed the modular application system from the web interface or web portal, a third path ("Path F") for users associated with the first user type that accessed the modular application system from an interface or website that is provided for responding to a direct mail offer, and so on.

Accordingly, in some implementations, the modular application system may determine the initial application flow by mapping the set of attributes related to the initial user context to a particular segment, or by invoking a machine learning model to identify the segment associated with the user, which may then be further refined based on a mapping to a specific application sub-path. For example, as shown by reference number 225, a user associated with the first user type that accessed the modular application system from a web interface or web portal associated with a financial services provider may be mapped to Path A, and the modular application system may then determine a specific application sub-path within Path A based on additional attributes associated with the user. For example, in the case of the vehicle loan application, the modular application system may determine that the user is a single applicant (e.g., rather than a joint applicant or co-signer), and may then determine whether the user is in a state that has electronic title (eTitle) requirements and/or whether the user is required to agree to one or more stipulations to be approved for a vehicle loan. In one example, where the user is determined to be in an eTitle state and not subject to stipulation requirements, the user may be mapped to "Path A1," which may be associated with a sequence of MFE components for obtaining an offer (e.g., providing an interface for the user to log into a web application), accessing the offer (e.g., providing an interface for the user to select a financing or refinancing option), verifying eligibility (e.g., providing an interface for the user to select a vehicle and loan information and confirm personal information), and completing an agreement (e.g., providing an interface for the user to authorize a hard credit pull and sign an electronic loan agreement and title transfer). The modular application system may then communicate with backend microservices as-needed to access the appropriate data for servicing the functionality associated with each MFE component, and may trigger a process to fund the loan within a given time period if the loan is approved. Furthermore, as described herein, other paths and sub-paths may include other suitable sequences of MFE components that are personalized based on a specific set of user attributes.

In some implementations, as described herein, the modular application system may configure an initial flow for the application, which may include selecting a subset of the MFE components to present to the client device and the sequence in which to present the subset of the MFE components, based on various attributes associated with the user. However, in some cases, the user or customer segment that is initially mapped to the user context may be incorrect or inaccurate, or may change over time as the user interacts with the application and the modular application system obtains more information related to the user's context. Accordingly, as shown by reference number 230 in FIG. 2B, the modular application system may monitor actions that the user performs to interact with the application (or MFE components) that are presented to the user, which may be used as additional attributes to update the application flow in a dynamic manner. For example, as the user starts to interact with the application based on the initial flow of MFE components, the modular application system may capture information related to interactions between the user and the application, which may be passed back to the segmentation component as additional parameters. In some implementations, the segmentation engine may then remap the current user context to a user or customer segment based on the initial set of attributes and the additional parameters to determine whether there is a need to modify the flow of the application. For example, the additional parameters related to the user interactions may be used in combination with the attributes related to the user category, marketing channel, device type, or the like to determine the next MFE component to be presented to the client device. Furthermore, in some implementations, the next MFE component may be presented with a targeted message that is directed to the user of the client device, which may be based on the previous actions that the user has performed to interact with the application, a category or profile (e.g., a credit profile) associated with the user, and/or an application type (e.g., a vehicle loan or refinance), among other examples.

In this way, the modular application system may continue to dynamically refine and personalize the flow of the application as the user performs more actions to interact with the application. For example, FIG. 2C illustrates an example in which the modular application system initially maps a user context to an application flow for users associated with a given user type (e.g., users that are preapproved or prequalified for a vehicle loan). In the illustrated example, the subset of MFE components may include a sequence with a first MFE component 240 (e.g., related to presenting vehicle loan offers), which is followed by a second MFE component 245 (e.g., related to obtaining vehicle information), a third MFE component 250 (e.g., related to obtaining or presenting loan information), a fourth MFE component 255 (e.g., related to obtaining personal information), a fifth MFE component 260 (e.g., related to presenting and/or agreeing upon contract terms), and a sixth MFE component 265 (e.g., related to titles for a financed vehicle). However, a user context that is mapped to a different user type or customer segment may be mapped to a different sequence of MFE components (e.g., the application flow for a user with no known credit profile may start with the fourth MFE component 255 for obtaining personal information, which may be followed by the second MFE component 245 for obtaining vehicle information, the third MFE component 250 for obtaining or presenting loan information, the first MFE component 240 for presenting vehicle loan offers, the fifth MFE component 260 for presenting and/or agreeing upon contract terms, the sixth MFE component 265 related to titles for a financed vehicle, and a seventh MFE component for handling one or more stipulations. Accordingly, the sequence of MFE components may be dynamically modified based on actions that the user performs when interacting with the application (e.g., to switch between different sequences of MFE components or otherwise personalize the next MFE component that is presented based on the available information related to the current context associated with the user). In this way, the modular application system may present only the MFE components that are needed to complete the application based on the available information related to the current context associated with the user and/or efficiently leverage the available information related to the current context associated with the user to create a customized and personalized experience with functionality that is optimized for each user.

As indicated above, FIGS. 2A-2C are provided as an example. Other examples may differ from what is described with regard to FIGS. 2A-2C.

Figure 3:
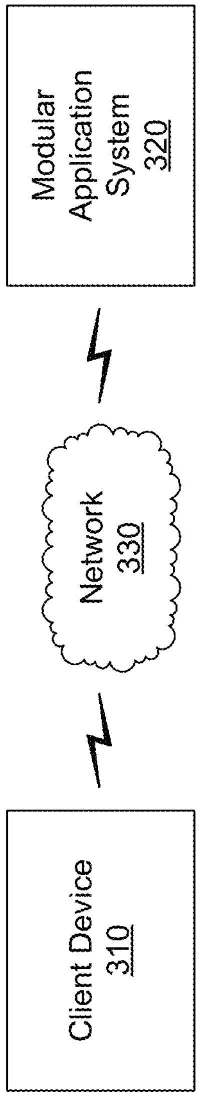
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a client device 310, a modular application system 320, and a network 330. Devices of environment 300 may interconnect via wired connections, wireless connections, or a combination of wired and wireless connections.

The client device 310 may include one or more devices capable of receiving, generating, storing, processing, and/or providing information associated with a modular application system decomposed into separate MFEs to support personalized application flows, as described elsewhere herein. The client device 310 may include a communication device and/or a computing device. For example, the client device 310 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The modular application system 320 may include one or more devices capable of receiving, generating, storing, processing, providing, and/or routing information associated with a modular application that may be decomposed into separate MFEs to support personalized application flows, as described elsewhere herein. The modular application system 320 may include a communication device and/or a computing device. For example, the modular application system 320 may include a server, such as an application server, a client server, a web server, a database server, a host server, a proxy server, a virtual server (e.g., executing on computing hardware), or a server or computing hardware used in a cloud computing system.

The network 330 may include one or more wired and/or wireless networks. For example, the network 330 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 330 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
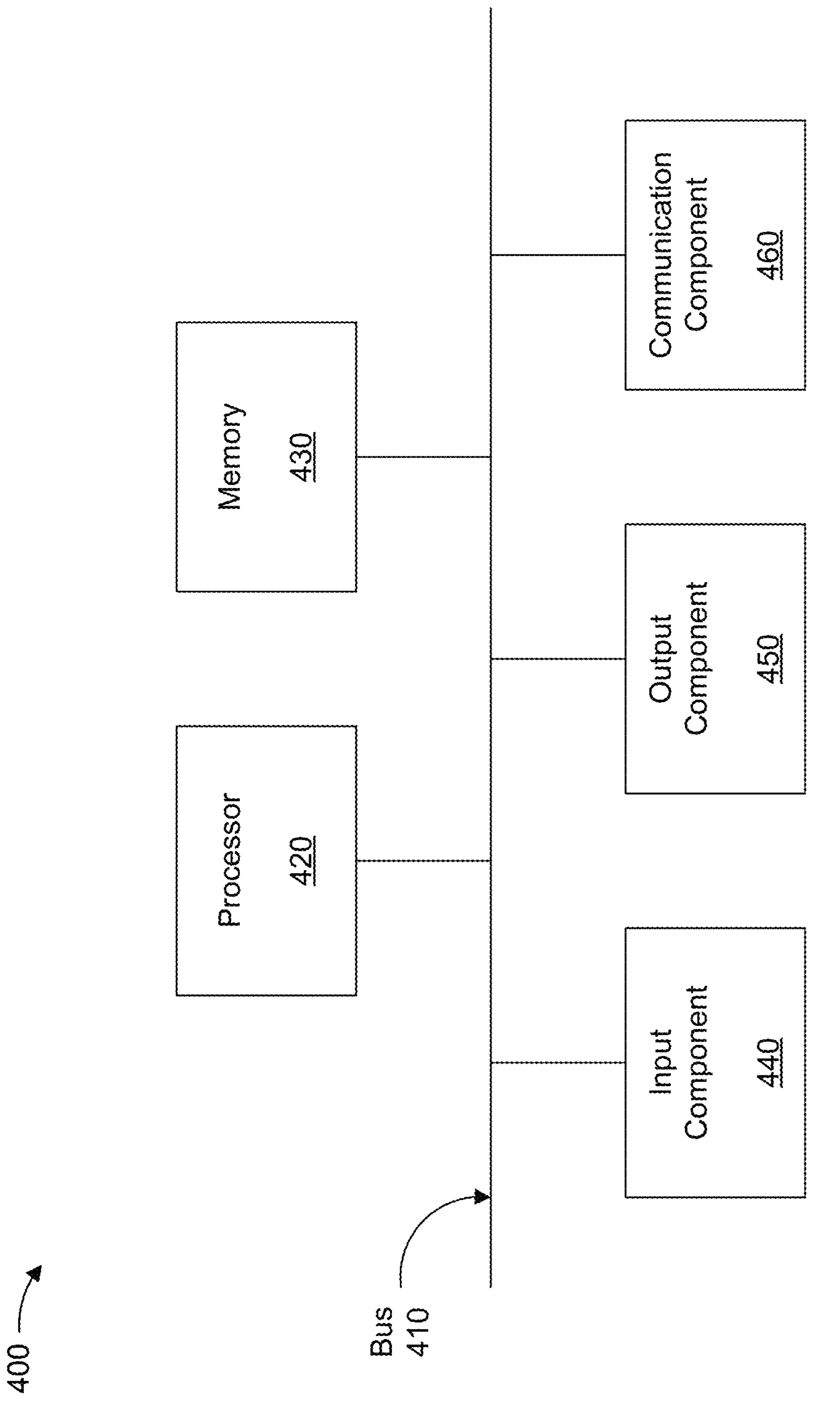
FIG. 4 is a diagram of example components of a device associated with a modular application system decomposed into separate MFEs to support personalized application flows.

FIG. 4 is a diagram of example components of a device 400 associated with a modular application system decomposed into separate MFEs to support personalized application flows. The device 400 may correspond to the client device 310 and and/or the modular application system 320. In some implementations, the client device 310 and/or the modular application system 320 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
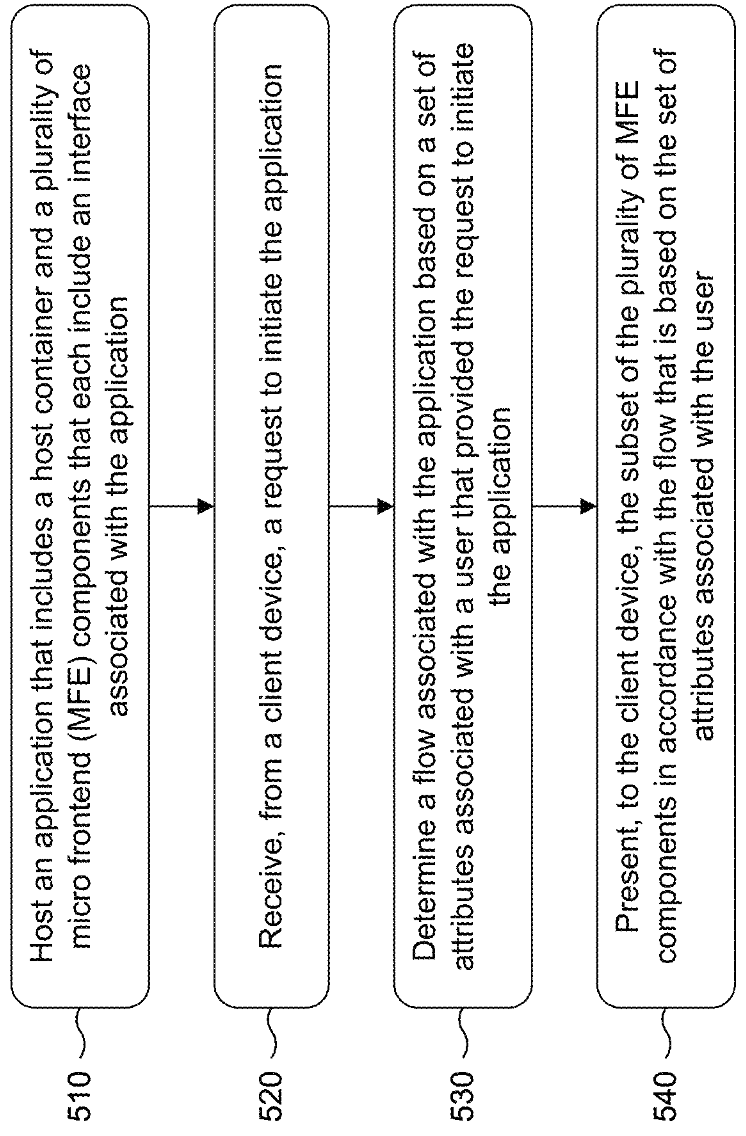
FIG. 5 is a flowchart of an example process associated with a modular application system decomposed into separate MFEs to support personalized application flows, in accordance with some embodiments of the present disclosure.

FIG. 5 is a flowchart of an example process 500 associated with a modular application system decomposed into separate MFEs to support personalized application flows. In some implementations, one or more process blocks of FIG. 5 may be performed by the modular application system 320. In some implementations, one or more process blocks of FIG. 5 may be performed by another device or a group of devices separate from or including the modular application system 320, such as the client device 310. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include hosting an application that includes a host container and a plurality of MFE components that each include an interface associated with the application (block 510). For example, the modular application system (e.g., using processor 420 and/or memory 430) may host an application that includes a host container and a plurality of MFE components that each include an interface associated with the application, as described above in connection with FIG. 2A. In some implementations, the host container provides an entry point to the application. In some implementations, each interface included in a respective MFE component of the plurality of MFE components includes one or more interactive elements. As an example, the modular application system may host an application associated with applying for a financial product or credit product, such as a vehicle loan or vehicle refinancing, and the various MFE components may each be designed to include one or more interfaces with interactive elements to complete one or more steps or sub-steps of applying for the financial product (e.g., providing personal information, identifying a vehicle to be financed, selecting loan terms, electronically signing a contract, uploading income verification documents, or the like).

As further shown in FIG. 5, process 500 may include receiving, from a client device, a request to initiate the application (block 520). For example, the modular application system (e.g., using processor 420, memory 430, input component 440, and/or communication component 460) may receive, from a client device, a request to initiate the application, wherein the request is received at the host container that provides the entry point to the application, as described above in connection with reference number 205 of FIG. 2A. As an example, the host container may include a host application and an associated host BFF, and each MFE component may also include an associated BFF. Accordingly, when the client device submits the request to initiate the application, the request may be received at the host container, which may extract or otherwise capture various attributes that relate to a current context associated with the request.

As further shown in FIG. 5, process 500 may include determining a flow associated with the application based on a set of attributes associated with a user that provided the request to initiate the application (block 530). For example, the modular application system (e.g., using processor 420 and/or memory 430) may determine a flow associated with the application based on a set of attributes associated with a user that provided the request to initiate the application, wherein the flow associated with the application includes a sequence in which a subset of the plurality of MFE components is presented to the user, as described above in connection with reference number 210 of FIG. 2A. As an example, the modular application system may determine a category or credit profile associated with the user (e.g., whether the user is a preapproved or prequalified user, a guaranteed rate user, a business as usual user, or the like), may determine a marketing channel associated with the user (e.g., direct mail, email, credit monitoring services, or the like), and/or a type of device associated with the client device (e.g., laptop, desktop, mobile, or the like), which may be mapped to a particular user or customer segment that defines a subset of MFE components to be presented to users in the particular user or customer segment and the sequence in which such MFE components are to be presented.

As further shown in FIG. 5, process 500 may include presenting, to the client device, the subset of the plurality of MFE components in accordance with the flow that is based on the set of attributes associated with the user (block 540). For example, the modular application system (e.g., using processor 420, memory 430, and/or output component 450) may present, to the client device, the subset of the plurality of MFE components in accordance with the flow that is based on the set of attributes associated with the user, as described above in connection with FIG. 2C. As an example, the modular application system may present one or more interfaces associated with a current MFE component to the client device, and may progress to a next MFE component after the user has completed one or more actions to interact or otherwise respond to the interactive elements associated with the current MFE component.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 2A-2C. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for personalizing an application flow, the system comprising:

one or more memories; and one or more processors, communicatively coupled to the one or more memories, the one or more processors configured to cause the system to:

host an application that includes a host container and a plurality of micro frontend (MFE) components that each include an interface associated with the application, wherein the host container provides an entry point to the application, and wherein each interface included in a respective MFE component of the plurality of MFE components includes one or more interactive elements;

receive, from a client device, a request to initiate the application, wherein the request is received at the host container that provides the entry point to the application;

determine a flow associated with the application based on a set of attributes associated with a user that provided the request to initiate the application, wherein the set of attributes includes a category associated with the user, and wherein the flow associated with the application includes a sequence in which a subset of the plurality of MFE components is presented to the user;

monitor one or more user interactions with the subset of the plurality of MFE components, wherein the set of attributes includes the one or more user interactions with the subset of the plurality of MFE components, and wherein the flow is updated based on the one or more user interactions with the subset of the plurality of MFE components and based on the category associated with the user; and present, to the client device, the subset of the plurality of MFE components in accordance with the updated flow.

2. The system of claim 1, wherein the host container and the plurality of MFE components are each associated with a respective backend for frontend (BFF) to enable communication with one or more backend microservices.

3. The system of claim 1, wherein the set of attributes includes a channel through which the user provided the request to initiate the application and the category associated with the user.

4. The system of claim 1, wherein the one or more processors, to determine the flow associated with the application, are configured to cause the system to:

select, from the plurality of MFE components associated with the application, the subset of the plurality of MFE components to present to the user based on the set of attributes.

5. The system of claim 1, wherein the one or more processors are further configured to cause the system to:

define multiple paths associated with the application, wherein the multiple paths each correspond to the subset of the plurality of MFE components and a sequence in which to present the subset of the plurality of MFE components for a combination of user attributes.

6. The system of claim 5, wherein the one or more processors, to determine the flow associated with the application, are configured to cause the system to:

map the set of attributes to a path of the multiple paths associated with the application.

7. The system of claim 6, wherein the one or more processors, to determine the flow associated with the application, are further configured to cause the system to:

map the set of attributes to a sub-path associated with the path mapped to the set of attributes, wherein the sub-path defines the subset of the plurality of MFE components to present to the user and the sequence in which to present the subset of the plurality of MFE components to the user.

8. A method for personalizing an application flow, comprising:

hosting, by a system, an application that includes a host container and a plurality of micro frontend (MFE) components that each include an interface associated with the application, receiving, by the system and from a client device, a request to initiate the application, wherein the request is received at the host container;

identifying, by the system, a set of attributes associated with a user that provided the request to initiate the application, determining, by the system, a flow associated with the application based on the set of attributes, wherein the set of attributes includes a category associated with the user, and wherein the flow associated with the application includes a sequence in which a subset of the plurality of MFE components is presented to the user;

monitoring one or more user interactions with the subset of the plurality of MFE components, wherein the set of attributes includes the one or more user interactions with the subset of the plurality of MFE components, and wherein the flow is updated based on the one or more user interactions with the subset of the plurality of MFE components and based on the category associated with the user; and presenting, by the system and to the client device, the subset of the plurality of MFE components in accordance with the updated flow.

9. The method of claim 8, wherein:

the host container provides an entry point to the application, and each interface included in a respective MFE component of the plurality of MFE components includes one or more interactive elements.

10. The method of claim 8, wherein the host container and the plurality of MFE components are each associated with a respective backend for frontend (BFF) to enable communication with one or more backend microservices.

11. The method of claim 8, wherein the set of attributes includes a channel through which the user provided the request to initiate the application and the category associated with the user.

12. The method of claim 8, wherein determining the flow associated with the application comprises:

selecting, from the plurality of MFE components associated with the application, the subset of the plurality of MFE components to present to the user based on the set of attributes.

13. The method of claim 8, further comprising:

defining multiple paths associated with the application, wherein the multiple paths each correspond to the subset of the plurality of MFE components and a sequence in which to present the subset of the plurality of MFE components for a combination of user attributes.

14. The method of claim 13, wherein determining the flow associated with the application comprises:

mapping the set of attributes to a path of the multiple paths associated with the application.

15. The method of claim 14, wherein determining the flow associated with the application comprises:

mapping the set of attributes to a sub-path associated with the path mapped to the set of attributes, wherein the sub-path defines the subset of the plurality of MFE components to present to the user and the sequence in which to present the subset of the plurality of MFE components to the user.

16. A non-transitory computer-readable medium storing a set of instructions, the set of instructions comprising:

one or more instructions that, when executed by one or more processors of a system, cause the system to:

host an application that includes a host container and a plurality of micro frontend (MFE) components that each include an interface associated with the application;

receive, from a client device, a request to initiate the application, wherein the request is received at the host container;

determine a flow associated with the application based on a set of attributes associated with a user that provided the request to initiate the application, wherein the set of attributes includes a category associated with the user, and wherein the flow associated with the application includes a sequence in which a subset of the plurality of MFE components is presented to the user;

monitor one or more user interactions with the subset of the plurality of MFE components, wherein the set of attributes includes the one or more user interactions with the subset of the plurality of MFE components, and wherein the flow is updated based on the one or more user interactions with the subset of the plurality of MFE components and based on the category associated with the user; and present, to the client device, the subset of the plurality of MFE components in accordance with the updated flow.

17. The non-transitory computer-readable medium of claim 16, wherein the host container and the plurality of MFE components are each associated with a respective backend for frontend (BFF) to enable communication with one or more backend microservices.

18. The non-transitory computer-readable medium of claim 16, wherein the set of attributes includes a channel through which the user provided the request to initiate the application and the category associated with the user.

19. The non-transitory computer-readable medium of claim 16, wherein the one or more instructions, that cause the system to determine the flow associated with the application, cause the system to:

select, from the plurality of MFE components associated with the application, the subset of the plurality of MFE components to present to the user based on the set of attributes.

20. The non-transitory computer-readable medium of claim 16, wherein the one or more instructions further cause the system to:

define multiple paths associated with the application, wherein the multiple paths each correspond to the subset of the plurality of MFE components and a sequence in which to present the subset of the plurality of MFE components for a combination of user attributes.

* * * * *